United States Patent Office

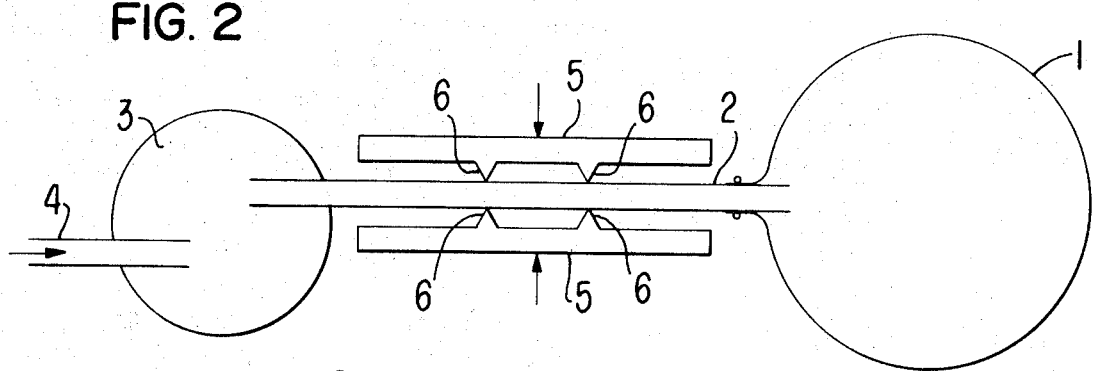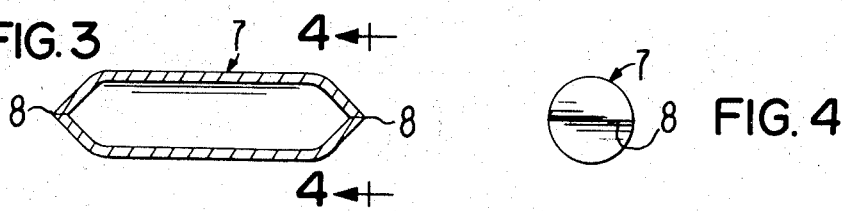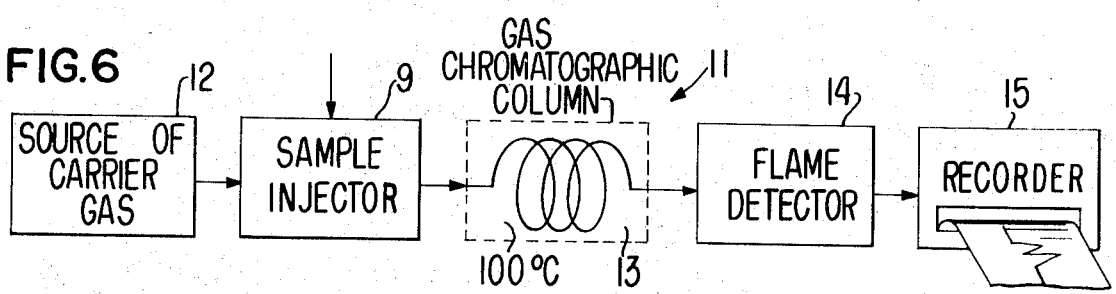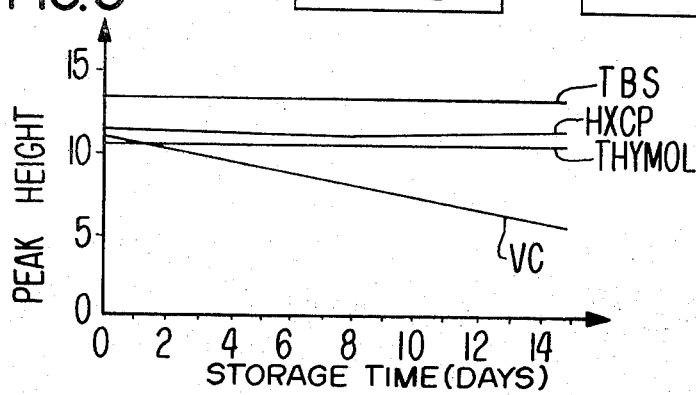

3,618,394
Patented Nov. 9, 1971

3,618,394
METHOD AND APPARATUS FOR PRESERVING BREATH SAMPLES
James R. Penton, Oakland, Calif., assignor to Varian Associates, Palo Alto, Calif.
Filed June 24, 1969, Ser. No. 836,070
Int. Cl. G01n 1/22
U.S. Cl. 73—421.5 R                 9 Claims

ABSTRACT OF THE DISCLOSURE

A breath sample suspected of containing volatile organic material, such as alcohol, capable of being degraded by metabolic activity of micro-organisms such as bacteria present in the breath, is captured in a container which also contains an anti-micro-organism agent for terminating or substantially delaying the activity of the micro-organisms, thereby preserving the organic material in the breath.

DESCRIPTION OF THE PRIOR ART

Heretofore, attempts to store organic gases, particularly breath samples, have failed by reason of changes in the composition of the stored gases with time. For example, the alcohol constituent of stored breath (ethanol in alveolar breath) was found to be substantially depleted within twenty four hours of storage. Such changes were attributed to diffusion through the walls of the container, such as a plastic bag, or by chemical reactions among the gaseous constituents. A reliable breath storage technique is desirable such that the breath can be sampled and captured in the field at locations remote from a central breath analyzer for subsequent analysis at the central location. This greatly reduces the number of breath analyzers required for a given area such as that covered by a large metropolitan police department.

SUMMARY OF THE PRESENT INVENTION

The principal object of the present invention is the provision of an improved method and apparatus for storage and preservation of organic gases having a volatile organic constituent capable of being degraded by the action of micro-organisms.

One feature of the present invention is the inclusion of an anti-micro-organism agent with the organic gases, as stored within a container, whereby metabolic activity of micro-organisms which could degrade the volatile organic constituents of the gases is arrested or delayed.

Another feature of the present invention is the same as the first feature wherein the anti-micro-organism agent is selected from the group consisting of, disinfectant, germicide, biocide, bacteriocide, biostat, antiseptic, bacteriostat, antibiotic, and mixtures thereof.

Another feature of the present invention is the same as any one or more of the preceding wherein the anti-micro-organism agent is coated on the interior surfaces of the container.

Another feature of the present invention is the same as any one or more of the preceding features wherein the container is a length of indium tubing pinched off at both ends.

Other features and advantages of the present invention will become apparent upon a perusal of the following specification taken in connection with the accompanying drawings wherein:

BRIEF DESCRIPTION OF THE DRAWINGS

FIG. 1 is a flow diagram in block diagram form depicting a method for storing, preserving and utilizing breath samples, FIG. 2 is a schematic line diagram depicting a method and apparatus for capturing breath samples, FIG. 3 is a longitudinal sectional view of an encapsulated sample, FIG. 4 is an end view of the capsule of FIG. 3 taken along line 4—4 in the direction of the arrows, FIG. 5 is a plot of ethanol content versus storage time in days for breath samples stored in the presence of several different anti-micro-organism agents and in the absence of such agents, and FIG. 6 is a schematic block diagram of a breath analyzer for analyzing breath samples.

DESCRIPTION OF THE PREFERRED EMBODIMENTS

Referring now to FIG. 1, there is shown a flow diagram depicting the steps in a method for storing and preserving breath samples according to the present invention. In step (a), a suitable anti-micro-organism agent is put into solution with a volatile solvent. Suitable anti-micro-organism agents include a broad class of materials including disinfectants, germicides, biocides, bacteriocides, biostats, antiseptics, bacteriostats, antibiotics and mixtures thereof. Such anti-micro-organism agents preferably have a relatively low vapor pressure, are stable with temperature, light, etc. Particularly suitable agents include halogenated aromatic hydroxy compounds, phenols, and salts and complexes of heavy metals. The halogenated aromatic hydroxy compounds include (3,4′,5 - tribromosalicylanilide) also known as TBS which is available from Maumee Chemical Company of Toledo, Ohio; and (2,2′-dihydroxy - 3,5,6,3′,5,6, herachlorodiphenylmethane) also known as hexachlorophene. The phenols include, (2-hydroxy - 1 - isopropyl - 4 - methylbenzene) also known as thymol; and cresols. The salts and complexes of heavy metals include merthiolate and mercurochrome. In a typical example of the solution, 1 mg. of thymol is dissolved per ml. of acetone.

In step (b), the inside walls of the container, which contain the sample gases, is rinsed with the solution. In step (c) the container is allowed to drain and dry to leave a coating of the anti-micro-organism agent on the interior walls of the container.

In a preferred embodiment, the container comprises a length of indium tubing, as of 0.140″ inside diameter and several inches long. The tubing when filled with sample gas, is crimped or pinched off at an interval, as of 1″ long, to produce an encapsulated sample of known volume. This sample encapsulation technique is disclosed in U.S. Pat. 3,063,286 issued Nov. 13, 1962.

In step (d), the coated sample container is stored for subsequent use. In step (e), the sample container is taken from storage, filled with sample gas and sealed closed. A suitable method and apparatus for filling the sample container with alveolar breath is depicted in FIG. 2. More particularly, a waste bag 1 is affixed over one end of a length of sample container tubing 2, as of indium. A saliva trap 3 is affixed to the other end of the tubing 2. The subject, whose breath is to be tested, fills the waste bag 1 by exhaling alveolar breath into the input port 4 of the saliva trap 3. The breath fills the container tube 2 and bag 1. When sufficient breath is collected, the tubing 2 is pinched off via a pinch-off tool 5 which crimps the tubing 2 together at points 6 to encapsulate the breath into a capsule 7 defined between the crimped ends of the section of tubing 2. Typically, the sample capsule 7 (see FIG. 3) has a length of approximately 1 inch and is sealed by cold welded seals 8 at each end.

In step (f), the breath samples, as contained in capsules 7, are transported to a central analysis station or are stored for subsequent use. In step (g), a sample capsule 7 is inserted into a sample injector 9 (see FIG.

6) of a gas analyzer such as a gas chromatograph 11 for analysis as to content of certain organic vapor constituents, such as ethanol. A typical sample injector for injecting indium encapsulated gaseous samples is described in U.S. Pat. 3,119,252 issued Jan. 28, 1964. In this system, the capsule is melted to release its contents into the carrier gas stream obtained from a source of carrier gas 12, such as a mixture of $N_2$ and $H_2$ gas. The carrier gas carries the sample gases into a gas chromatographic column 13 for separation of various constituents thereof into time displaced peaks in the carrier gas stream. The eluted gas stream from the column 13 is fed to a flame detector 14 which may use the $H_2$ component of the carrier gas stream for fuel. The detected sample gas constituents of the carrier gas stream appear as electrical peak signals in the output of the detector 14 and are fed to the input of a recorder 15 for recording as a function of time. The peak height, position, and area under the respective peak yields both quantitative and qualitative information about the constituents of the sample under analysis. More particularly, ethanol is readily identified and its peak height can be calibrated to yield concentrations of ethanol to within 1% accuracy. These measured concentrations of ethanol correlate directly with the amount of alcohol in the blood.

Referring now to FIG. 5, there is shown a plot of ethanol peak height, as obtained from the system of FIG. 6, versus storage time for the storage of breath samples in capsules 7 for several different coatings on the inside walls of an indium capsule 7. As can be seen from the plot, the ethanol content of the sample, as of ¼ ml. volume, was not degraded for a storage time of 30 days for anti-micro-organism agent coatings of TBS, hexachlorophene, and thymol, whereas the uncoated indium allowed substantial degradation of the ethanol content over this storage time. However, it should be noted that the uncoated indium offers substantial improvement in storage time as compared with uncoated plastic, glass, etc., wherein the ethanol content was completely degraded within twenty four hours. It is believed this improved storage time for indium is due to the anti-bacterial effect of indium metal.

Although in the preferred embodiment, the anti-microorganism agent is coated on the walls of an indium capsule this is not a requirement. The anti-micro-organism agent may be included with the stored sample gases in a number of other ways such as by being mixed with the sample gas, coated on a member inserted into the container, etc. Also the container need not be an indium capsule but may take other forms such as vials, bags, etc. and may be made of other materials such as glass, plastic, etc.

Also the method and apparatus of the present invention is applicable in general to storage of organic gases which have constituents capable of being degraded by metabolic activity of micro-organisms present in the gases.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a method for preserving breath samples the step of, capturing a sample of exhaled breath in a container in the presence of an anti-micro-organism agent.

2. The method of claim 1 wherein the anti-microorganism agent is coated on the inside wall of the breath sample container.

3. The method of claim 1 wherein the container is an indium tube, and wherein the breath sample is captured by filling the tube with breath and pinching off both ends of a section of the breath filled indium tube to form cold weld gas-tight seals at both ends of the container.

4. The method of claim 1 wherein the anti-micro-organism agent is selected from the group consisting of, disinfectant, germicide, biocide, bacteriocide, biostat, antiseptic, bacteriostat, antibiotic, and mixtures thereof.

5. The method of claim 1 wherein the anti-micro-organism agent is selected from the group consisting of, halogenated aromatic hydroxy compounds, phenols, salts of heavy metals, complexes of heavy metals, and mixtures thereof.

6. The method of claim 1 wherein the anti-micro-organism agent is selected from the class consisting of (3,4',5 - tribromosalicylanilide), (2,2' - dihydroxy - 3,5, 6,3',5,6, herachlorodiphenylmethane), and (2 - hydroxy-1-isopropyl-4-methylbenzene).

7. In a sample container for preserving fluid samples having a volatile organic constituent capable of being degraded by metabolic activity of micro-organisms, means forming a container for containing the fluid sample, means forming a non-volatile organic anti-micro-organism agent disposed within said container means in fluid communication with the sample and said anti-micro-organism agent is coated on the inside surfaces of said tube, and wherein said agent is selected from the group consisting of (3,4',5 - tribromosalicylanilide), (2,2' - diphydroxy - 3,5,6,3',5,6 herachlorodiphenylmethane), (2-hydroxy - 1 - isopropyl - 4 - methylbenzene), and mixtures thereof.

8. The apparatus of claim 7 wherein said container means is an indium tube.

9. In a sample container for preserving fluid samples having a volatile organic constituent capable of being degraded by metabolic activity of micro-organisms, means forming a container tube for containing the fluid sample, means forming an anti-micro-organism agent disposed within said container means in fluid communication with the sample and said anti-micro-organism agent is coated on the inside surfaces of said tube, and wherein said agent is selected from the group consisting of (3,4',5-tribromosalicylanilide) (2 - 2' - diphydroxy - 3,5,6,3',5,6 herachlorodiphenylmethane), (2 - hydroxy - 1 - isopropyl-4-methylbenzene), and mixtures thereof.

References Cited

UNITED STATES PATENTS

| | | | |
|---|---|---|---|
| 1,343,579 | 6/1920 | Palmer | 220—64 |
| 2,653,893 | 9/1953 | Romans | 220—64 |
| 2,797,223 | 6/1957 | Stampe | 128—2 |
| 3,063,286 | 11/1962 | Nerheim | 73—422 X |

OTHER REFERENCES

Wertheim, Textbook of Organic Chemistry, second edition, The Blakiston Company, Philadelphia, copyright 1945, pp. 494 and 495 relied upon.

S. CLEMENT SWISHER, Primary Examiner

U.S. Cl. X.R.

21—2; 220—64